US011485274B2

(12) United States Patent
Archie

(10) Patent No.: US 11,485,274 B2
(45) Date of Patent: Nov. 1, 2022

(54) TENSIONING SYSTEM WITH LOCKING ASSEMBLY FOR CARGO SECUREMENT

(71) Applicant: Ancra International LLC, Azusa, CA (US)

(72) Inventor: Daniel R. Archie, Walton, KY (US)

(73) Assignee: ANCRA INTERNATIONAL LLC, Azusa, CA (US)

( * ) Notice: Subject to any disclaimer, the term of this patent is extended or adjusted under 35 U.S.C. 154(b) by 265 days.

(21) Appl. No.: 16/993,625

(22) Filed: Aug. 14, 2020

(65) Prior Publication Data
US 2021/0053479 A1  Feb. 25, 2021

Related U.S. Application Data

(60) Provisional application No. 62/889,173, filed on Aug. 20, 2019.

(51) Int. Cl.
B60P 7/08 (2006.01)

(52) U.S. Cl.
CPC .................... B60P 7/083 (2013.01)

(58) Field of Classification Search
CPC ....................................................... B60P 7/083
USPC ............. 410/103, 100, 11, 12, 97, 102, 105; 254/217, 258, 251, 256; 24/68 d, 71.1, 24/200, 270, 68 ct, 69 t
See application file for complete search history.

(56) References Cited

U.S. PATENT DOCUMENTS

| 2,824,717 | A | * | 2/1958 | James | F16G 11/12 24/270 |
| 3,070,395 | A | | 12/1962 | Morrison et al. | |
| 3,259,411 | A | * | 7/1966 | Griffiths | E05C 19/145 292/DIG. 31 |
| 3,887,966 | A | * | 6/1975 | Gley | A44B 11/125 24/200 |
| 4,500,073 | A | * | 2/1985 | Smith | F16G 15/00 254/258 |
| 4,743,052 | A | | 5/1988 | Stammreich et al. | |
| 4,768,815 | A | | 9/1988 | Harmon | |
| 4,796,336 | A | | 1/1989 | Scully | |
| 5,494,387 | A | * | 2/1996 | Ruegg | B60P 7/083 24/69 ST |

(Continued)

OTHER PUBLICATIONS

International search report and written opinion for PCT/US2020/046331 dated Nov. 17, 2020, 15 pgs.

*Primary Examiner* — D Glenn Dayoan
*Assistant Examiner* — Sunsurraye Westbrook
(74) *Attorney, Agent, or Firm* — Crowell & Moring LLP

(57) ABSTRACT

A locking assembly is provided including a frame. The frame includes a slot and a recess positioned at a top portion of the frame. The assembly further includes a handle rotatably coupled to an end of the frame that is opposite the slot. The handle is rotatable between an open position and a closed position. The slot is configured to receive an attachment means. When the attachment means is in the slot and the handle is in the closed position, the handle is positioned in the slot on top of the attachment means such that the attachment means is prevented from moving with respect to the frame. A latch may be mounted to the handle. The latch is slidable between a locked position where a pin extending from the latch engages the recess of the frame and an unlocked position where the pin is positioned outside the recess.

18 Claims, 5 Drawing Sheets

(56) References Cited

U.S. PATENT DOCUMENTS

| | | |
|---|---|---|
| 5,894,638 A | 4/1999 | Huang |
| 6,374,465 B1 | 4/2002 | Dykstra |
| 7,020,933 B2 | 4/2006 | Chang |
| 8,037,580 B2 | 10/2011 | Huang |
| 8,152,139 B2 | 4/2012 | Wang |
| 8,291,552 B2 | 10/2012 | Gopal et al. |
| 8,925,979 B2 | 1/2015 | Hernandez et al. |
| 9,242,592 B1 | 1/2016 | Meszaros |
| 9,624,790 B2 | 4/2017 | Fabre et al. |
| 9,884,581 B1 | 2/2018 | Royt |
| 2003/0084550 A1 | 5/2003 | Fang |
| 2004/0128802 A1 | 7/2004 | Templeton |
| 2012/0267591 A1 | 10/2012 | Bond |
| 2016/0090021 A1 | 3/2016 | Dunmire |

\* cited by examiner

TENSIONING SYSTEM WITH LOCKING ASSEMBLY FOR CARGO SECUREMENT

PRIORITY CLAIM

This invention claims the benefit of priority of U.S. Provisional Application Ser. No. 62/889,173, entitled "Tensioning System with Locking Assembly for Cargo Securement," filed Aug. 20, 2019, the disclosure of which is hereby incorporated by reference in its entirety.

TECHNICAL FIELD

This disclosure relates to the field of cargo securement and, in particular, to a tensioning system and locking assembly for cargo securement.

BRIEF SUMMARY

A first representative embodiment of the disclosure is provided. In this embodiment, a locking assembly for a chain is provided that includes a frame. The frame includes a top portion, a first end, a second end, a slot, and a recess. The slot is positioned at the first end and is configured to receive a chain. The recess is positioned at the top portion of the frame and toward the first end of the frame. The locking assembly further includes a handle rotatably coupled to the second end of the frame. The handle is rotatable between an open position and a closed position. When the chain is in the slot and the handle is in the closed position, the handle is positioned in the slot on top of the chain, such that the chain is prevented from moving with respect to the frame. The locking assembly further includes a latch slidably mounted to the handle. The latch is slidable between a locked position and an unlocked position. The latch includes a pin extending laterally outward from the latch and a spring. The spring biases the latch into the locked position. The pin of the latch is configured to engage the recess of the frame when the handle is in the closed position and the latch in the locked position, such that the handle is prevented from rotating with respect to the frame.

In another embodiment, a tensioning system is provided that includes a frame. The frame includes a body portion, a first arm, and a second arm. The first arm and the second arm extend from the body portion. The body portion of the frame includes a slot shaped to receive an attachment means. The frame includes a first recess defined between a top surface of the body portion and a top surface of the first arm. The frame includes a second recess defined between the top surface of the body portion and a top surface of the second arm. The tensioning system further includes a handle having a first end and a second end. The second end of the handle is rotatably coupled to the frame between the first arm and the second arm. The handle is rotabable between an open position and a closed position. In the closed position the first end of the handle is positioned in the slot. The tensioning system further includes a latch slidably mounted to the handle. The latch is slidable between a locked position and an unlocked position. The latch includes a first pin and second pin extending laterally outward from opposite sides of the latch. The latch includes a spring. The spring biases the latch into the locked position toward the first end of the handle. The first pin of the latch is configured to engage the first recess of the frame and the second pin of the latch is configured to engage the second recess of the frame when the handle is in the closed position and the latch in the locked position, such that the handle is prevented from rotating with respect to the frame.

In yet another embodiment, a method of use for a locking assembly is provided. A chain is positioned in the locking assembly. The locking assembly includes a frame. The frame includes a top portion, a first end, a second end, a slot positioned at the first end, the slot configured to receive the chain, and a recess positioned at the top portion of the frame and toward the first end of the frame. The locking assembly further includes a handle rotatably coupled to the second end of the frame. The handle is rotatable between an open position and a closed position. The locking assembly further includes a latch slidably mounted to a top surface of the handle. The latch is slidable between a locked position and an unlocked position. The latch includes a pin extending laterally outward from the latch and a spring. The spring biases the latch into the locked position. The latch is slid from the locked position to the unlocked position. The latch is held in the unlocked position against a biasing force of the spring. The handle is rotated into the slot of the frame. The latch is returned to the locked position, such that the pin of the latch is facilitated to engage the latch of the frame by following the radius feature of the frame until the pin engages the recess of the frame. The radius feature may be an outer radial edge and/or a peripheral edge of the frame. The handle is prevented from rotating with respect to the frame. The handle is positioned in the slot in the closed position and on top of the chain, such that the chain is prevented from moving with respect to the frame.

Advantages of the disclosed devices will become more apparent to those skilled in the art from the following description of embodiments that have been shown and described by way of illustration. As will be realized, other and different embodiments are contemplated, and the disclosed details are capable of modification in various respects. Accordingly, the drawings and description are to be regarded as illustrative in nature and not as restrictive.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION OF THE DRAWINGS AND THE PRESENTLY PREFERRED EMBODIMENTS

Figure 1:
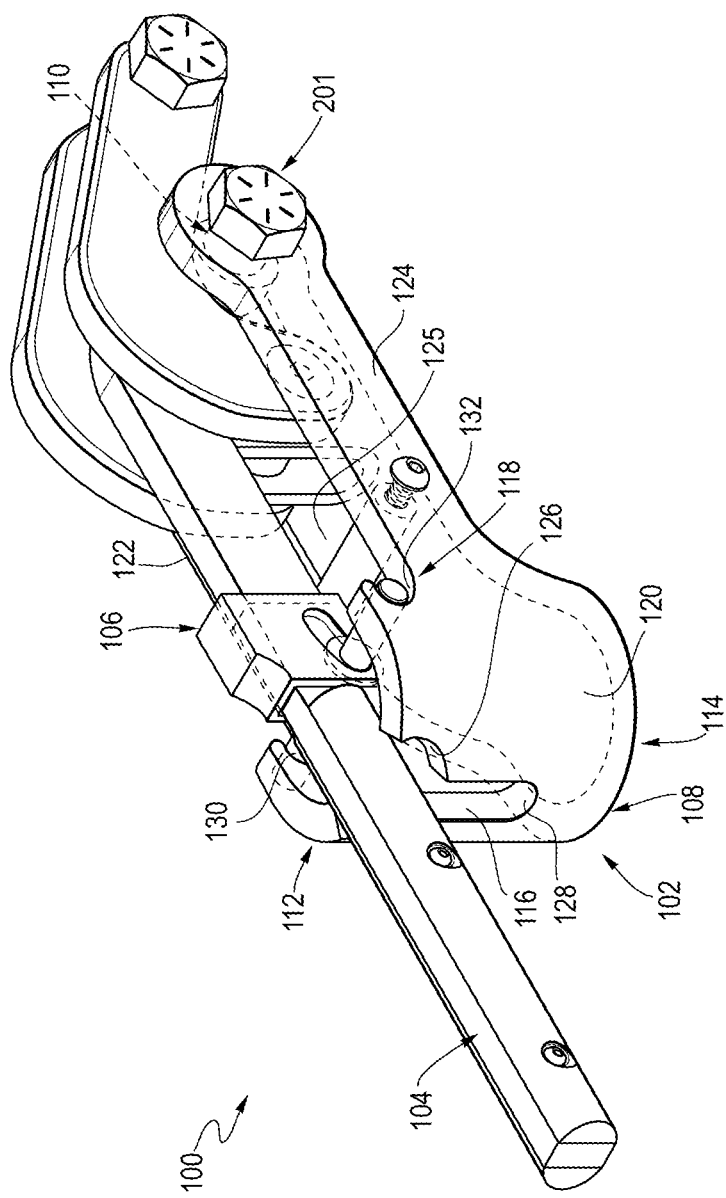
FIG. 1 illustrates a perspective view of an example a locking assembly.
Figure 2:
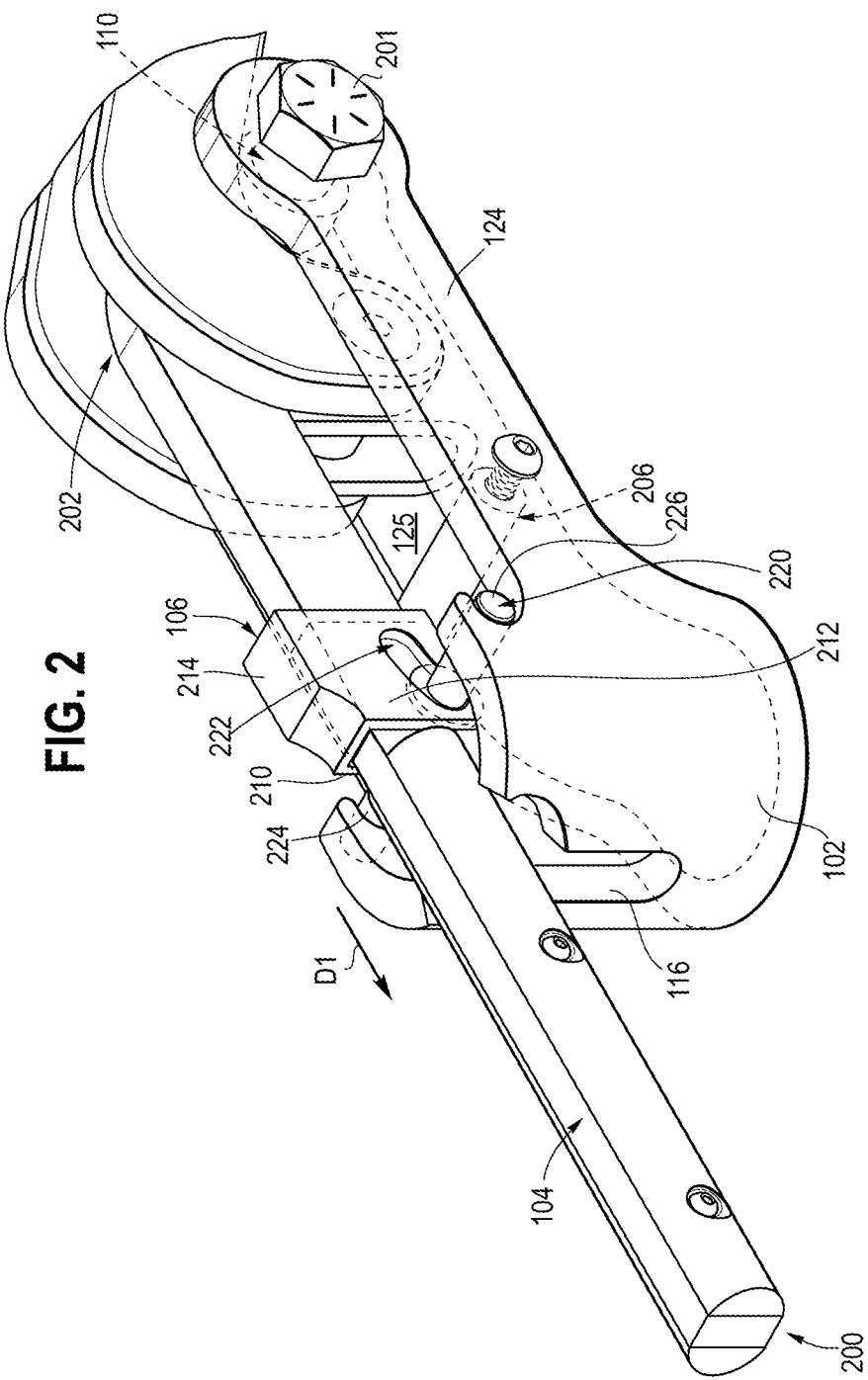
FIG. 2 illustrates a perspective view of an example of the locking assembly.
Figure 3:
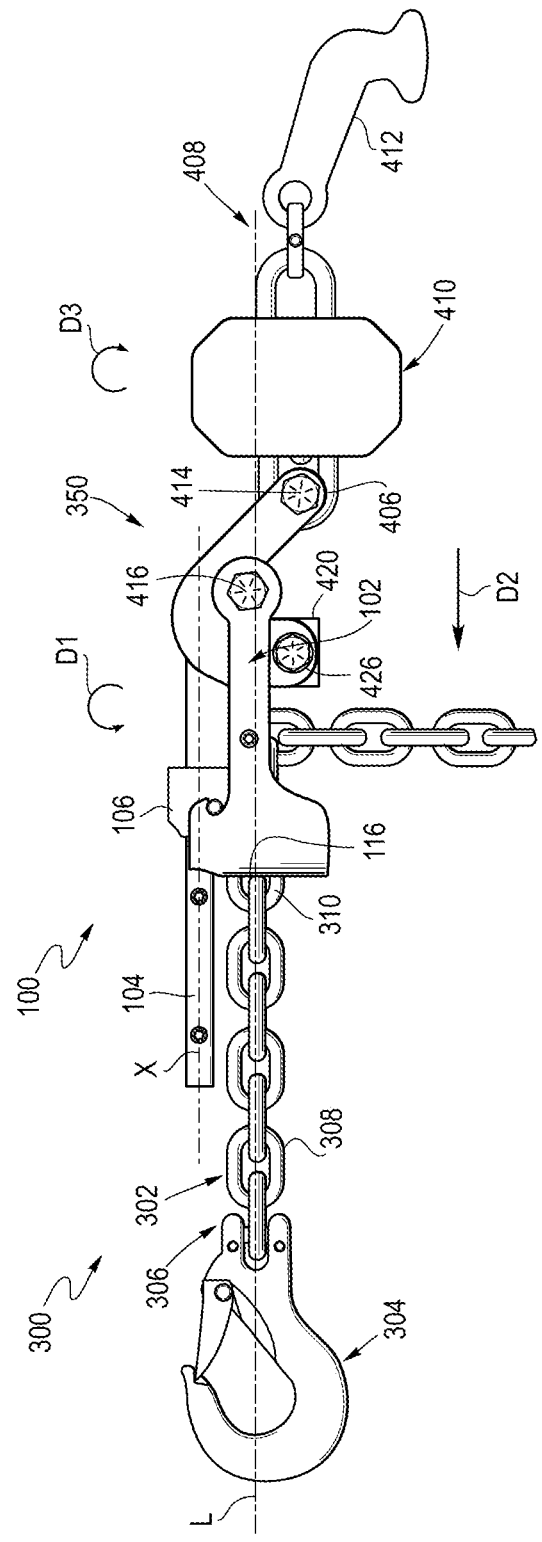
FIG. 3 illustrates a side view an example of a tensioning system.
Figure 4:
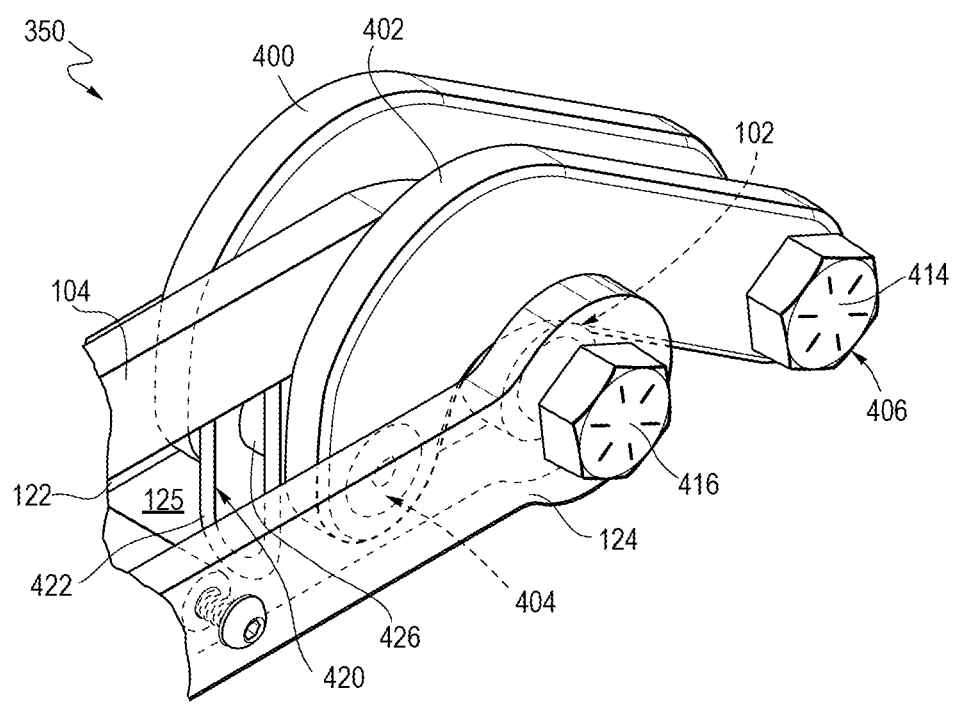
FIG. 4 illustrates a perspective view of an example of a linking assembly.

FIGS. 1-2 and 5-6 illustrate perspective views of a first embodiment of a locking assembly 100 for cargo securement. FIG. 3 illustrates a side view of a tensioning system 300 for cargo securement. FIG. 4 illustrates a perspective view of a linking assembly.

FIG. 1 is a perspective view of the locking assembly 100. FIG. 2 is a close-up view of the locking assembly 100. FIG. 3 illustrates a perspective view of a tensioning system 300, which includes the locking assembly 100. The locking assembly 100 may be any mechanism which locks in place an attachment means for rigging or tying down cargo. Examples of the attachment means may include a chain, a cargo securement strap, a rope, or any other elongated structure suitable for securing cargo. As shown in FIG. 1, the locking assembly 100 may include a frame 102, a handle 104 rotatably coupled to the frame 102, and a latch 106 slidably mounted to the handle 104.

The frame 102 may be any rigid structure that surrounds or encloses at least a portion of the attachment means when the locking assembly 100 is in use. As shown in FIG. 1, the frame 102 includes a first end 108, a second end 110 opposite the first end, a top portion 112, and a bottom portion 114 opposite the top portion 112. The frame 102 may further include a slot 116 formed in the first end of the frame 102 and a recess 118 formed in the top portion 112 of the frame 102 toward the first end 108 of the frame 102. As shown in FIG. 1, the frame 102 may be in a clevis shape having a curved body portion 120 at the first end 108 with a first arm 122 and a second arm 124 extending from either side of the curved body portion 120 and toward the second end 110. The first arm 122 and the second arm 124 may define a cavity 125 therebetween.

The slot 116 may be an aperture configured to have the attachment means positioned therein. The slot 116 may be in any shape suitable for receiving the attachment means. For example, when the attachment means is a chain, the slot may include an upper portion 126 and a lower portion 128. As shown in FIG. 1, the upper portion 126 may be wider than the lower portion 128. In this example, the lower portion 128 of the slot 116 is shaped to receive the chain only when a link of the chain is in a substantially vertical position. The upper portion 126 is shaped with sufficient width to receive the handle 104. In other words, a width of the handle 104 may be smaller but similar to a width of the upper portion 126, such that a portion of the handle 104 with a rounded ergonomic shape, fits within the upper portion 126. A width of the handle may be wider than a width of the link of the chain in a substantially vertical position. Alternatively or in addition, a width of the handle may be wider than a width of the lower portion 128, such that the handle is prevented from being positioned in the lower portion 128. In other examples, the slot 116 may have a uniform width and/or be shaped to receive alternate attachment means, such as a cargo strap or rope.

The recess 118 may be any notch formed in the top portion 112 of the frame 102 that is configured to receive a portion of the latch 106. The recess 118 may include a first recess 130 and a second recess 132. The first recess 130 may be defined between a top surface of the curved body portion 120 and a top surface of the first arm 122. The second recess 132 may be defined between a top surface of the curved body portion 120 and a top surface of the second arm 124.

As shown in FIG. 1-2, the locking assembly 100 includes the handle 104. The handle 104 will be further described herein with reference to FIG. 2. The handle 104 may be an elongated portion of the locking assembly 100 configured to be grasped by a user and pivoted between open and closed positions. For example, in FIGS. 1-2, the handle 104 in the closed position. The handle includes a first end 200 and a second end 202. The second end 202 of the handle 104 may be rotatably coupled to the second end 110 of the frame 102 by a bolt 201 that extends through the first arm 122, the second arm 124, and the handle 104. The handle 104 may be rotatable between an open position and a closed position. In the open position the handle 104 is rotated, such that the handle 104 is positioned outside of the slot 116. Alternatively or in addition, in the open position the handle 104 is rotated, such that the handle 104 is positioned outside of the cavity 125. In the closed position, as shown in FIGS. 1-2, the handle 104 is rotated, such that the handle 104 is positioned in the upper portion 126 of the slot 116. When the attachment means is positioned in the slot 116 and the handle 104 is in the closed position, the handle 104 may be positioned in the slot 116 on top of the attachment means, such that movement of the attachment means with respect to the frame 102 is prevented and/or limited.

The frame 102 may further include a spacer 206 extending through the first arm 122 and the second arm 124. The spacer 206 provides a stability support to deter torsion and/or rotation of the first arm 122 and/or the second arm 124 and the collapse and/or expansion of the cavity 125 under tension loading.

The latch 106 may be any device having a mating surface that is configured to engage the frame. As shown in FIGS. 1-2, the latch 106 is mounted to a topside of the handle 104. The latch 106 may include a first side 210, a second side 212, and a top side 214. As shown in FIG. 2, the top side 214 is positioned on a surface of the handle that faces away from the top portion 112 of the frame 102 when the handle is in the closed position. The first side 210 and the second side 212 extend from the opposite edges of the top side 214 of the latch 106 and along opposite sides of the handle 104. As shown in FIG. 2, the top side 214 may be formed to include an ergonomic depression for placement of a user thumb to more easily grip and move the latch 106 or other ergonomic features.

The latch may further include a pin 220 and a spring 222. The pin 220 may be any lateral projection extending laterally outward from the latch 106 that is configured to engage the recess 118. The spring 222 may be any device configured to press against the latch 106, such that the latch 106 may be biased toward the first end 200 of the handle 104. The latch 106 may be slidable between a locked position and an unlocked position. When the handle 104 is in the closed position and the locked position, as shown in FIG. 2, the pin 220 is disposed within a volume of the recess 118 of the frame 102. When in the locked position, the spring 222 biases the latch 106 in a direction D1, such that pin 220 of the latch 106 is held in the recess 118. When the pin 220 is held in the recess 118 by the force of the spring 222, the handle 104 is prevented from rotating with respect to the frame.

The pin 220 may include a first pin 224 and a second pin 226. The first pin 224 extends from the first side 210 of the latch 106 and the second pin 226 extends from the second side 212 of the latch 106. In one example, the first pin 224 and the second pin 226 are coupled to the latch 106. In another example, the first pin 224 and the second pin 226 may be integrally formed with the latch 106. The first pin 224 is configured to engage the first recess 130 and the second pin 226 is configured to engage the second recess 132, such that the pin 220 engages the recess 118 when the handle 104 is in the closed position with the latch 106 in the locked position.

FIG. 3 is a side view of a tensioning system 300 which includes the locking assembly 100, the attachment means 302, and a linking assembly 350. FIG. 3 illustrates an example of the tensioning system 300, where the handle 104 is in the closed position and the latch 106 is in the locked position. As shown in FIG. 3, the handle 104 may have a longitudinal axis (X) extending through an elongated portion of the handle 104.

The attachment means 302 may be positioned in the slot 116 and the cavity 125 of the frame 102. The attachment means 302 may include a fixing means 304 positioned at an end 306 of the attachment means 302. The fixing means 304 may be any device configured to fix the attachment means 302 to a predetermined structure. As shown in FIG. 3, an example of the fixing means 304 may be a hook. In examples where the attachment means 302 is a chain 308, a single link 310 of the chain may be positionable in the slot 116 (largely hidden from view in FIG. 3) of the frame 102 when the link 310 is in a substantially vertical position.

FIG. 4 shows a close-up view of a portion of the linking assembly 350. The linking assembly may include a first leaf 400 and a second leaf 402 spaced away from the first leaf 400. The handle 104 extends between the first leaf 400 and the second leaf 402. The first leaf 400 and second leaf 402 may each have a first linking end 404 and a second linking end 406. The first linking end 404 of the first leaf 400 and the second leaf 402 may be rotatably coupled to the second end 202 of the handle 104.

As shown in FIG. 3, the second linking end 406 may be coupled to an anchor member 408. The anchor member 408 may be any device positioned at an end of the tensioning system opposite the fixing means 304. As shown in FIG. 3, the anchor member 408 may include a shock absorber 410 and a retainer 412. The shock absorber may be any device configured to absorb jolts and/or vibrations of the tensioning system 300. The retainer 412 may be any device configured to be fixed to another predetermined structure.

As further shown in FIG. 3, the second linking end 406 may be rotatably coupled to the anchor member 408 at a first point 414, for example by a bolt or like fastener, and the handle 104 may be rotatably coupled to the frame 102 at a second point 416 by a bolt or like fastener. During operation, when both the fixing means 304 and the anchor member 408 are fixed to respective structures, a distance between the first point 414 and the second point 416 increases when the handle 104 is rotated from the closed position to the open position. Likewise, when the handle 104 is rotated from the open position to the closed position, the distance between the first point 414 and the second point 416 decreases. Because both ends of the tensioning system 300 are fixed, when the distance between the first point 414 and second point 416 decreases, tension is added to the tensioning system 300.

As shown further shown in FIG. 3, when the handle 104 is in the closed position and the latch is in the locked position, the locking assembly 100 may be in an over-center position. When the locking assembly 100 is in the over-center position, the link bolt 426, the first linking end 404, and the linking member 420 may be below a load line (L). The load line (L) may be any line and/or axis through which a load and/or tension is applied by the tensioning system. In the over-center position, the load line (L) is parallel to the longitudinal axis (X) of the handle 104. The over-center position promotes a self-locking force on the handle 104 in the closed and locked position.

As further shown in FIG. 4, when the handle 104 is in the closed position, the first leaf 400 is positioned between the handle 104 and the first arm 122 of the frame 102. Likewise, when the handle 104 is in the closed position, the second leaf 402 is positioned between the handle 104 and the second arm 124 of the frame 102. Additionally, when the handle 104 is in the closed position, at least a portion of the linking assembly 350 is positioned in the cavity 125 of the frame 102.

In some examples, as shown in FIG. 4, the linking assembly 350 may further include a linking member 420 coupled to the first leaf 400 and the second leaf 402 at the first linking end 404. The linking member 420 may any device configured to convert rotation of the handle 104 into movement of linking assembly 350. The linking member 420 may be positioned between the first leaf 400 and the second leaf 402 and below the handle 104, when the handle is in the closed position. In some examples, the linking member 420 may be an elongated, u-shaped piece having a first link end 422 and a second link end (largely hidden from view in FIG. 4) opposite the first link end 422. The linking member 420 may be coupled to the first leaf 400 and the second leaf 402 by a link bolt 426 extending through the first leaf 400, the second leaf 402, and the first link end 422 of the linking member 420. The linking member 420 may be coupled to the second end 110 of the handle 104, the first arm 122, and the second arm 124 by the bolt 201 extending therethrough. When the handle 104 is rotated from the closed to the open position, the linking member 420 may cause the leaves 400, 402 to be positioned away from the frame 102.

Figure 5:
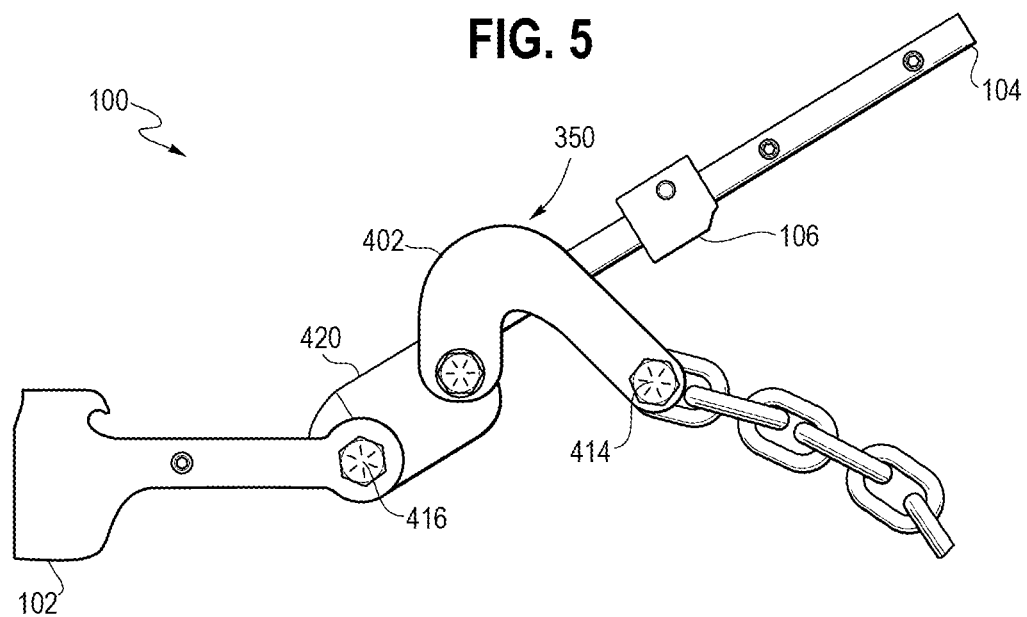
FIG. 5 illustrates a side view of an example of the locking assembly.

FIG. 5 illustrates an example of the locking assembly 100 in which the handle 104 is in the open position. As shown in FIG. 5, when the handle 104 is rotated toward the open position, the leaves 400, 402 are positioned away from the frame.

Figure 6:
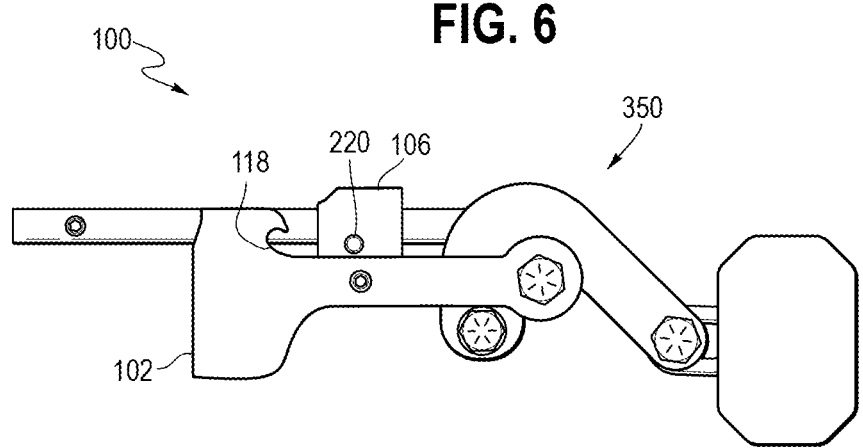
FIG. 6 illustrates a side view of an example of the locking assembly.

FIG. 6 illustrates another example of the locking assembly 100 in which the handle 104 is in the closed position and the latch 106 is in the unlocked position, such that the pin 220 of the latch 106 does not engage the recess 118 of the frame 102.

During operation, in order to reach the locked position from the unlocked position, a user may rotate the handle 104, such that the first pin 224 and second pin 226 contact and follow the radius of the frame 102 and the bias action of the spring 220 will cause the first pin 224 and second pin 226 to rest in recess 118 and latch 106 to move to the lock position. In an alternate method, a user may slide the latch 106 against the spring 222 (opposite of the direction of the arrow D1 in FIG. 2) to allow the pin 220 to clear an edge of the frame 102. The handle 104 is rotated into the slot 116 in the closed position. When the handle 104 is in the closed position, the latch 106 is released. Upon release of the latch 106, the pin 220 extends into and engages the recess 118 of the frame 102. The biasing force of the spring 222 holds the latch 106 in the locked position, which holds the handle 104 in the closed position. To return the handle 104 to the open position from the closed, locked position, a user slides the latch 106 into the unlocked position and pivots and/or rotates the handle 104 into the open position, which releases tension from the tensioning system 300.

Rotation of the handle 104 in a first direction (D1) may also cause the linking assembly 350 to move in a second direction (D2), which when rotating the handle 104 between the open toward the closed position applies tension to the tensioning system 300. The linking assembly may be connected to an anchor member 408, such as a chain that is fixed to a predetermined structure. As shown in FIG. 3, when handle is rotated from the open to the closed position, the handle 104 is rotated in the first direction (D1).

Rotation of the handle 104 in a third direction (D3), for example when moving the handle 104 from the closed position to the open position, may cause the handle 104 to contact the linking member 420. As the handle 104 contacts the linking member 420 and is rotated in the third direction (D3), the linking member 420, the first linking end 404, the first leaf 400 and the second leaf 402 may be rotated in direction (D3). The third direction (D3) may be opposite of the first direction (D1). The third direction (D3) may be in a circular path. The sinusoidal function of the circular path may have the effect of gradually releasing any tension load on the tensioning system 300, which may prevent and/or limit kickback when unlocking the latch 106 and opening the handle 104 to release tension from the tensioning system 300.

The tensioning system 300 and locking assembly 100 may be implemented with additional, different, or fewer components. For example, the locking assembly may include only the frame 102, the handle 104, and the latch 106. In this example, the second end 110 of the frame 102 may be fixed to a predetermined structure.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

What is claimed is:

1. A locking assembly for a chain, the locking assembly comprising:
    a frame comprising a top portion, a first end, a second end, a slot positioned at the first end, the slot configured to receive a chain, and a recess positioned at the top portion of the frame and toward the first end of the frame;
    a handle rotatably coupled to the second end of the frame, the handle being rotatable between an open position and a closed position, wherein when the chain is in the slot and the handle is in the closed position, the handle is positioned in the slot on top of the chain such that the chain is prevented from moving with respect to the frame; and
    a latch slidably mounted to the handle, the latch slidable between a locked position and an unlocked position, the latch comprising a pin extending laterally outward from the latch and a spring, wherein the spring biases the latch into the locked position, wherein the pin of the latch is configured to engage the recess of the frame when the handle is in the closed position and the latch in the locked position, such that the handle is prevented from rotating with respect to the frame.

2. The locking assembly of claim 1, wherein the frame is in a clevis shape, the frame having a curved body portion at the first end and first and second arms extending from either side of the curved body portion and toward the second end.

3. The locking assembly of claim 2, wherein the handle extends between the first and second arms of the frame by a bolt that extends through the handle and the first and second arms.

4. The locking assembly of claim 1, wherein the slot includes an upper portion and a lower portion, wherein the lower portion is narrower than the upper portion.

5. The locking assembly of claim 4, wherein the lower portion of the slot is shaped to receive a link of the chain only when the link is in a substantially vertical position, and wherein the upper portion is shaped to receive the handle, wherein a width of the handle aligned to extend within the upper portion of the slot is wider than a width of the link of the chain to be received within the lower portion of the slot.

6. The locking assembly of claim 1, wherein the latch further comprises a top side, a first side, and a second side, wherein the top side is positioned on a surface of the handle that faces away from the top portion of the frame in the closed position, wherein the first side and the second side extend from the top side of the latch along opposite sides of the handle.

7. The locking assembly of claim 6, wherein the recess further comprises a first recess and a second recess positioned in the frame and the pin further comprises a first pin and a second pin, the first pin extends laterally outward from the first side of the latch and the second pin extends laterally outward from the second side of the latch, wherein the first recess is configured to receive the first pin and the second recess is configured to receive the second pin when the handle is in the closed position with the latch in the locked position.

8. A tensioning system, the tensioning system comprising:
    a frame having a body portion, a first arm, and a second arm, the first arm and the second arm extending from the body portion, wherein the body portion of the frame includes a slot shaped to receive an attachment means, wherein the frame includes a first recess defined between a top surface of the body portion and a top surface of the first arm, and a second recess defined between the top surface of the body portion and a top surface of the second arm;
    a handle having a first end and a second end, the second end of the handle rotatably coupled to the frame between the first arm and the second arm, the handle is rotabable between an open position and a closed position, wherein in the closed position the first end of the handle is positioned in the slot; and
    a latch slidably mounted to the handle, the latch slidable between a locked position and an unlocked position, the latch comprising a first pin and second pin extending laterally outward from opposite sides of the latch, the latch comprising a spring, wherein the spring biases the latch into the locked position toward the first end of the handle, wherein the first pin of the latch is configured to engage the first recess of the frame and the second pin of the latch is configured to engage the second recess of the frame when the handle is in the closed position and the latch in the locked position, such that the handle is prevented from rotating with respect to the frame.

9. The tensioning system of claim 8, further comprising a linking assembly having a first linking end and a second linking end, wherein the first linking end is rotatably coupled to the handle, wherein the second linking end is rotatably coupled to a an anchor member at a first point, wherein the handle is coupled to the frame at a second point, and wherein when the handle is rotated from the open position to the closed position a distance between the first point and the second point decreases.

10. The tensioning system of claim 9, wherein the linking assembly comprises a first leaf and a second leaf spaced away from the first leaf, wherein the handle extends between the first leaf and the second leaf, wherein when the handle is in the closed position, the first leaf is positioned between the handle and the first arm of the frame and the second leaf is positioned between the handle and the second arm of the frame.

11. The tensioning system of claim 10, further comprising a linking member coupled to the first linking end of the linking assembly by a link bolt extending through the first leaf, the second leaf, and the linking member, wherein when the handle is in the closed position, the link bolt is positioned below the handle, and wherein the linking member is coupled to handle near the second end of the handle.

12. The tensioning system of claim 11, further comprising a locking assembly including the frame, the handle, and the latch, wherein when the handle is in the closed position and the latch is in the locked position, the locking assembly is in an over-center position, and wherein, when the locking assembly is in the over-center position, the link bolt, the first linking end, and the linking member are below a load line, the load line being parallel to a longitudinal axis of the handle, wherein the over-center position is configured to promote a self-locking force on the handle.

13. The tensioning system of claim 11, wherein when the handle is rotated from the closed position to the open position, the handle is configured to contact the linking member to cause a rotation of the linking member, the first linking end, the first leaf, and the second leaf about the second point, wherein the rotation is in a circular path.

14. The tensioning system of claim 9, wherein the frame defines a cavity between the first arm and the second arm, wherein when the handle is in closed position, at least a portion of the linking assembly is positioned in the cavity.

15. The tensioning system of claim 14, wherein when the handle is in the open position, the linking assembly is positioned outside the cavity.

16. The tensioning system of claim 14, further comprising a spacer extending through the first arm and the second arm, wherein the spacer is configured to provide stability support to prevent or limit torsion or rotation of the first arm or the second arm, and wherein the spacer is configured to prevent or limit collapse or expansion of the cavity under tension loading.

17. The tensioning system of claim 8, wherein the attachment means is a chain, wherein the slot includes an upper portion and a lower portion, the upper portion being wider than the lower portion, and wherein the lower portion of the slot is shaped to receive a link of the chain only when the link is in a substantially vertical position, and wherein the upper portion is shaped to receive the handle, wherein a width of the handle aligned to extend within the upper portion of the slot is wider than a width of the link of the chain to be received within the lower portion of the slot.

18. A method of use for a locking assembly, the method comprising:
positioning a chain in the locking assembly, the locking assembly including:
a frame comprising a top portion, a first end, a second end, a slot positioned at the first end, the slot configured to receive the chain, and a recess positioned at the top portion of the frame and toward the first end of the frame;
a handle rotatably coupled to the second end of the frame, the handle being rotatable between an open position and a closed position; and
a latch slidably mounted to a top surface of the handle, the latch slidable between a locked position and an unlocked position, the latch comprising a pin extending laterally outward from the latch and a spring, wherein the spring biases the latch into the locked position;
sliding the latch from the locked position to the unlocked position and holding the latch in the unlocked position against a biasing force of the spring;
rotating the handle into the slot of the frame; and
returning the latch to the locked position, such that the pin of the latch engages the recess of the frame, wherein the handle is prevented from rotating with respect to the frame, wherein the handle is positioned in the slot in the closed position on top of the chain, such that the chain is prevented from moving with respect to the frame.

* * * * *